(12) United States Patent
Ozue et al.

(10) Patent No.: US 6,411,456 B1
(45) Date of Patent: Jun. 25, 2002

(54) MAGNETIC SIGNAL REPRODUCING METHOD AND APPARATUS

(75) Inventors: Tadashi Ozue; Toshio Shirai; Yoshiteru Kamatani, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/262,326

(22) Filed: Mar. 4, 1999

(30) Foreign Application Priority Data

Mar. 12, 1998 (JP) .......................................... 10-061690

(51) Int. Cl.$^7$ ................................................ G11B 15/18
(52) U.S. Cl. ............................................ 360/69; 360/75
(58) Field of Search .......................... 360/69, 74.5, 25, 360/134, 84, 107, 271, 271.5, 130.22–130.24; 243/334.2

(56) References Cited

U.S. PATENT DOCUMENTS 4,722,015 A * 1/1988 Ushiro ....................... 360/128
5,395,066 A * 3/1995 Yokoyama et al. ....... 360/71 X
5,587,848 A * 12/1996 Shimotashiro et al. .... 360/69 X
5,737,154 A * 4/1998 Kumagai et al. ........... 360/108

FOREIGN PATENT DOCUMENTS

JP    411203631    *    7/1999    ............ G11B/5/39

* cited by examiner

Primary Examiner—David Hudspeth
Assistant Examiner—K. Wong
(74) Attorney, Agent, or Firm—Sonnenschein, Nath & Rosenthal (57) ABSTRACT

A magnetic signal reproducing method and apparatus of the helical scan system employing an MR head. The apparatus includes a substantially cylindrically-shaped rotary drum, an inductive magnetic head loaded on the rotary drum, a magneto-resistive effect magnetic head having an amount of protrusion from the rotary drum smaller than that of the inductive magnetic head, a tape sort detection unit, and a tape tension control unit. If information signals are reproduced by the inductive magnetic head, the tape tension of the magnetic tape is decreased by the tape tension control unit and, if information signals are reproduced by the magneto-resistive effect magnetic head, the tape tension of the magnetic tape is increased by the tape tension control unit.

4 Claims, 7 Drawing Sheets

MAGNETIC SIGNAL REPRODUCING METHOD AND APPARATUS

BACKGROUND OF THE INVENTION

1. Field of the Invention

This invention relates to a helical scan magnetic signal reproducing method and apparatus employing a magneto-resistive effect magnetic head.

2. Description of the Related Art

In a magnetic reproducing apparatus, such as a video tape recorder, audio tape recorder or a data storage system for a computer, employing a magnetic tape as a recording medium, there is adopted a helical scan system for improving the recording density to increase the recording capacity.

In this magnetic reproducing apparatus, a higher recording density and a larger recording capacity are desired. For realizing this higher recording density and a larger recording capacity, it has been proposed to use a magneto-resistive effect magnetic head (MR head) as a playback magnetic head in the helical scan magnetic recording/reproducing apparatus.

The MR head uses a magneto-resistive effect element (MR element) as a magnetically sensitive element for detecting the magnetic field from the recording medium, and is put to practical use as a playback magnetic head of the hard disc drive. In general, the MR head is higher in sensitivity than the inductive magnetic head and is able to develop a large playback output. Thus, by using the MR head as the playback magnetic head, it is possible to realize a still higher recording density and a still larger recording capacity.

Meanwhile, in a hard disc drive, the MR head is loaded on the floating slider, so that data is reproduced under a condition in which the MR head is floated over the magnetic disc. On the other hand, if the MR head is used for the helical scan system, data is reproduced from the magnetic disc as the MR head is kept in sliding contact with the magnetic tape.

However, if the MR head is kept in sliding contact with the magnetic tape, there is presented a problem that, even if the playback output of the MR head is high, the MR head is worn out due to its sliding contact with the magnetic tape. If the MR head is worn out, the playback output level is fluctuated to increase the noise and so-called dropout. For this reason, the helical scan magnetic reproducing apparatus employing the MR head as the playback magnetic head has as yet not been put to practical use.

SUMMARY OF THE INVENTION

It is therefore an object of the present invention to provide a magnetic signal reproducing method and apparatus of the helical scan system employing an MR head devoid of the above-described inconvenience.

In one aspect, the present invention provides a magnetic signal reproducing apparatus including a substantially cylindrically-shaped rotary drum, an inductive magnetic head loaded on the rotary drum so that at least a portion thereof is protruded from the outer periphery of the rotary drum, a magneto-resistive effect magnetic head loaded on the rotary drum so that at least a portion thereof is protruded from the outer periphery of the rotary drum, tape sort discriminating means for detecting the sort of the magnetic tape, and tape tension control means for controlling the tape tension of the magnetic tape. The amount of protrusion of the magneto-resistive effect magnetic head from the outer periphery of the rotary drum is selected to be smaller than the amount of protrusion of the inductive magnetic head from the outer periphery of the rotary drum. In reproducing information signals from the magnetic tape, the sort of the magnetic tape is detected by the tape sort discriminating means, and the magnetic head used for reproducing the information signals is selected from the group of the inductive magnetic head and the MR head depending on the results of detection. The tape tension in case of reproducing the information signals by the inductive magnetic head is controlled by the tape tension control means so as to be smaller than the tape tension when the information signals are reproduced by the magneto-resistive effect magnetic head.

In this magnetic signal reproducing apparatus, in which the amount of protrusion of the magneto-resistive effect magnetic head is smaller than that of the inductive magnetic head, the contact pressure between the magneto-resistive effect magnetic head and the magnetic tape is smaller than that between the inductive magnetic head and the magnetic tape. Also, if, in this magnetic signal reproducing apparatus, information signals are reproduced by the magneto-resistive effect magnetic head, the tape tension of the magnetic tape is increased by tape tension control means, thus assuring optimum abutment of the magneto-resistive effect magnetic head with the magnetic tape.

In another aspect, the present invention provides a magnetic signal reproducing method for reproducing magnetic signals using a magnetic signal reproducing apparatus including a substantially cylindrically-shaped rotary drum, an inductive magnetic head loaded on the rotary drum so that at least a portion thereof is protruded from the outer periphery of the rotary drum, a magneto-resistive effect magnetic head loaded on the rotary drum so that at least a portion thereof is protruded from the outer periphery of the rotary drum, tape sort discriminating means for detecting the sort of the magnetic tape, and tape tension control means for controlling the tape tension of the magnetic tape. The amount of protrusion of the magneto-resistive effect magnetic head from the outer periphery of the rotary drum is selected to be smaller than the amount of protrusion of the inductive magnetic head from the outer periphery of the rotary drum. In reproducing information signals from the magnetic tape, the sort of the magnetic tape is detected by the tape sort discriminating means, the magnetic head used for reproducing the information signals is selected from the group of the inductive magnetic head and the MR head depending on the results of detection. The tape tension in case of reproducing the information signals by the inductive magnetic head is controlled by the tape tension control means so as to be smaller than the tape tension when the information signals are reproduced by the magneto-resistive effect magnetic head.

In this magnetic signal reproducing method, employing an apparatus in which the amount of protrusion of the magneto-resistive effect magnetic head is selected to be smaller than that of the inductive magnetic head, the contact pressure between the magneto-resistive effect magnetic head and the magnetic tape is smaller than that between the inductive magnetic head and the magnetic tape. Also, if, in this magnetic signal reproducing apparatus, information signals are reproduced by the magneto-resistive effect magnetic head, the tape tension of the magnetic tape is increased by tape tension control means, thus assuring optimum abutment of the magneto-resistive effect magnetic head with the magnetic tape.

DESCRIPTION OF THE PREFERRED EMBODIMENTS

Referring to the drawings, preferred embodiments of the present invention will be explained in detail.

The magnetic reproducing apparatus according to the present invention is such a magnetic reproducing apparatus employing a magnetic tape as a recording medium, and is used as a video tape recorder, an audio tape recorder or a data storage system for a computer. The magnetic reproducing apparatus according to the present invention is a helical scan magnetic recording/reproducing apparatus doing recording/reproduction using a rotary drum, and employs an MR head as a playback head loaded on the rotary drum.

Figure 1:
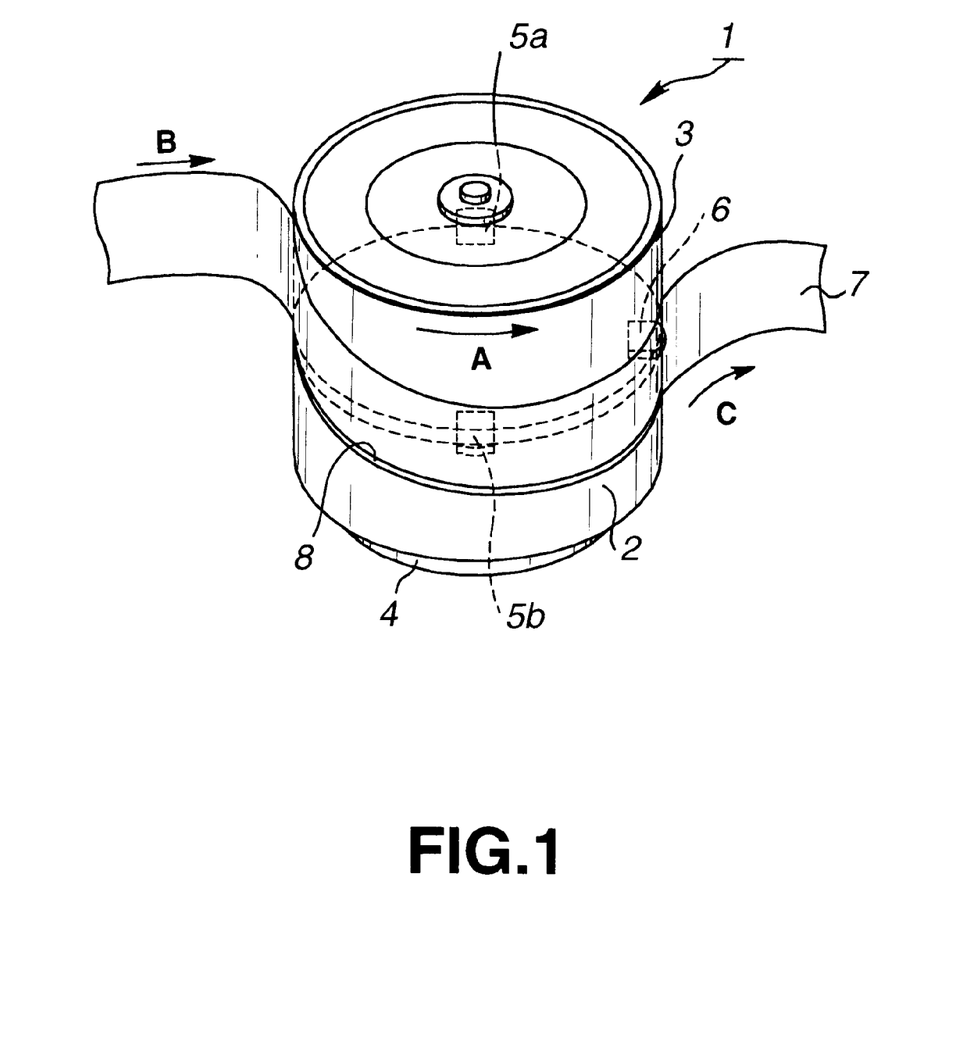
FIG. 1 is a perspective view showing an illustrative structure of a rotary drum device according to the present invention.

FIG. 1 shows an illustrative structure of a rotary drum device 1 loaded on a magnetic recording/reproducing apparatus embodying the present invention. FIG. 1 is a schematic perspective view showing the rotary drum device 1.

Referring to FIG. 1, the rotary drum device 1 includes a cylindrically-shaped fixed drum 2, a cylindrically-shaped rotary drum 3, a motor 4 for rotationally driving the rotary drum 3, a pair of inductive magnetic heads 5a, 5b and an MR head 6 loaded on the rotary drum 3.

Although the rotary drum device 1 of a so-called upper drum type having the rotary drum 3 arranged on the fixed drum 2, the present invention is applicable to a helical scan magnetic recording/reproducing apparatus without being limited to any particular types of the rotary drum device 1. For example, a so-called mid drum type rotary drum device, in which the rotary drum 3 is held between the paired fixed drums 2, may also be used.

In the above rotary drum device 1, the fixed drum 2 is a drum that is held without rotation. On the lateral side of the fixed drum 2 is formed a reel guide portion 8 for extending along the running direction of the magnetic tape 3. During recording/reproduction, the magnetic tape 7 is caused to run along the reel guide portion 8. The rotary drum 3 is arranged with its center axis coincident with that of the fixed drum 2.

The rotary drum 3 is run in rotation at a pre-set rpm by the motor 4 during recording/reproduction for the magnetic tape 7. This rotary drum 3 is of a cylindrical shape substantially of the same diameter as the fixed drum 2 and is arranged with its center axis coincident with that of the fixed drum 2. On the side of the rotary drum 3 facing the fixed drum 2 are loaded the inductive magnetic heads 5a, 5b and the MR head 6.

The inductive magnetic heads 5a, 5b are each a magnetic head having a pair of magnetic cores joined together via a magnetic gap and having coils placed thereon.

The inductive magnetic head 5a is, for example, a recording head used for recording information signals on the magnetic tape 7, while the inductive magnetic head 5b is a playback magnetic head used for reproducing information signals from the magnetic tape 7.

For these inductive magnetic heads 5a, 5b, any known recording magnetic head used in the conventional helical scan magnetic recording/reproducing apparatus may be used. Since the inductive magnetic head 5a and the inductive magnetic head 5b are of the same structure, these inductive magnetic heads 5a, 5b are collectively termed an inductive magnetic head 5.

Figure 2:
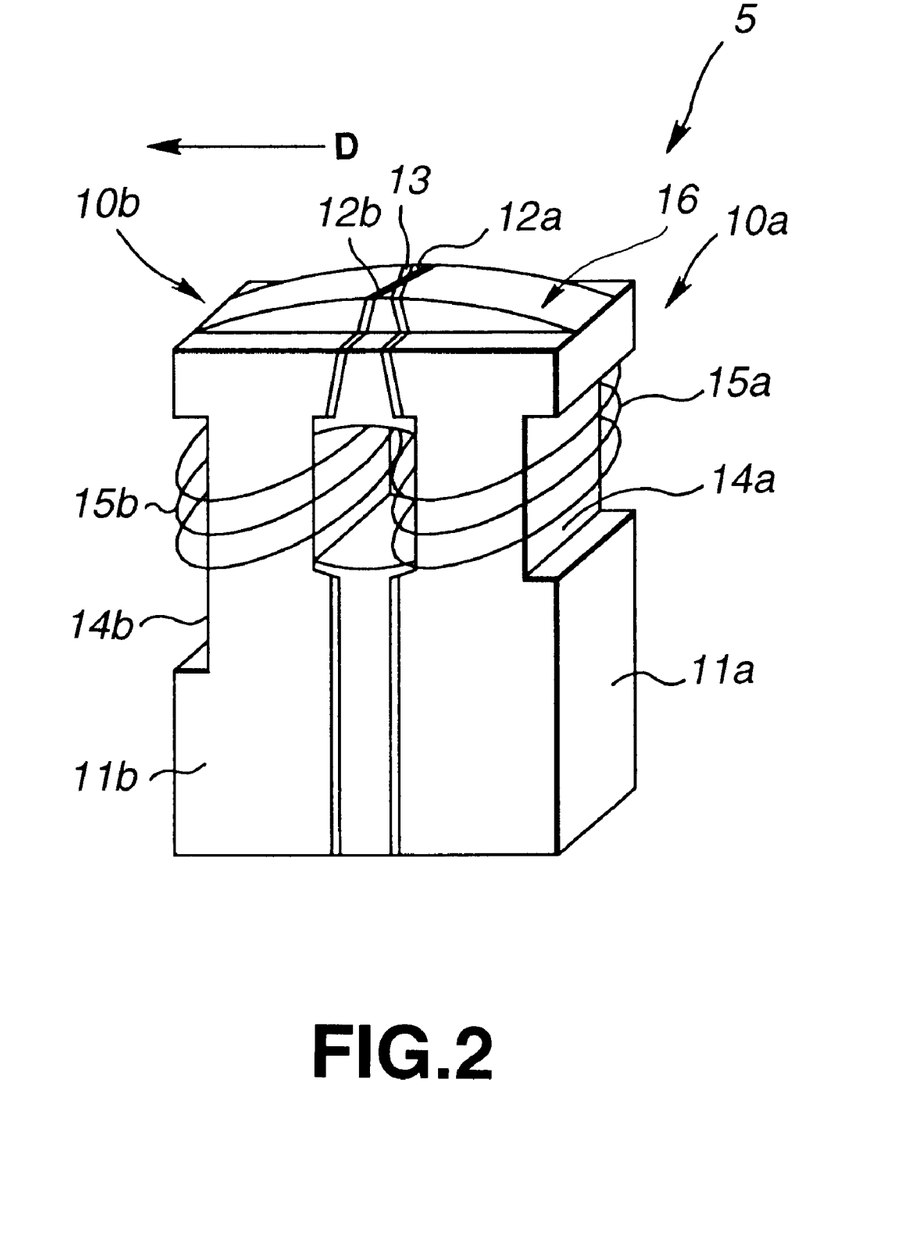
FIG. 2 is a perspective view showing a typical inductive magnetic head loaded on the rotary drum.

Specifically, a so-called metal-in-gap (MIG) magnetic head in which magnetic cores 10a, 10b are made up of soft magnetic substrates 11a, 11b of ferrite and magnetic metal films 12a, 12b formed on the soft magnetic substrates 11a, 11b, the paired magnetic cores 10a, 10b are joined together, with the magnetic gap 13 in-between, so that the magnetic metal films 12a, 12b face each other, and in which coils 15a, 15b are placed in winding grooves 14a, 14b, is most preferred.

This inductive magnetic head 5 is loaded on the rotary drum 3 so that at least a portion thereof is protruded from the outer rim of the rotary drum 3. Moreover, this inductive magnetic head 5 has its sliding surface 16 for the magnetic tape 7 ground cylindrically along the sliding direction of the inductive magnetic head 5 with respect to the magnetic tape 7, as indicated by arrow D, and along a direction at right angles to the sliding direction.

That is, the sliding surface 16 for the magnetic tape of the inductive magnetic head 5 is substantially spherically shaped with the most protuberant portions thereof being the magnetic gap 13 and its neighboring portions. This inductive magnetic head 5 is mounted on the rotary drum 3 so that the magnetic gap 13 and its near-by portion are protruded from the outer rim of the rotary drum 3.

The MR head 6 is a read-only magnetic head having the MR element as a magnetic sensitive element for detecting magnetic signals from the magnetic tape 7 by exploiting the magneto-resistive effect. The MR head 6 in general is higher in sensitivity and larger in playback output than the inductive magnetic head 5 doing recording/reproduction by exploiting the electromagnetic induction and hence is suited to high density recording. Thus, higher recording density can be achieved by employing the MR head 6 as the playback magnetic head.

Figure 3:
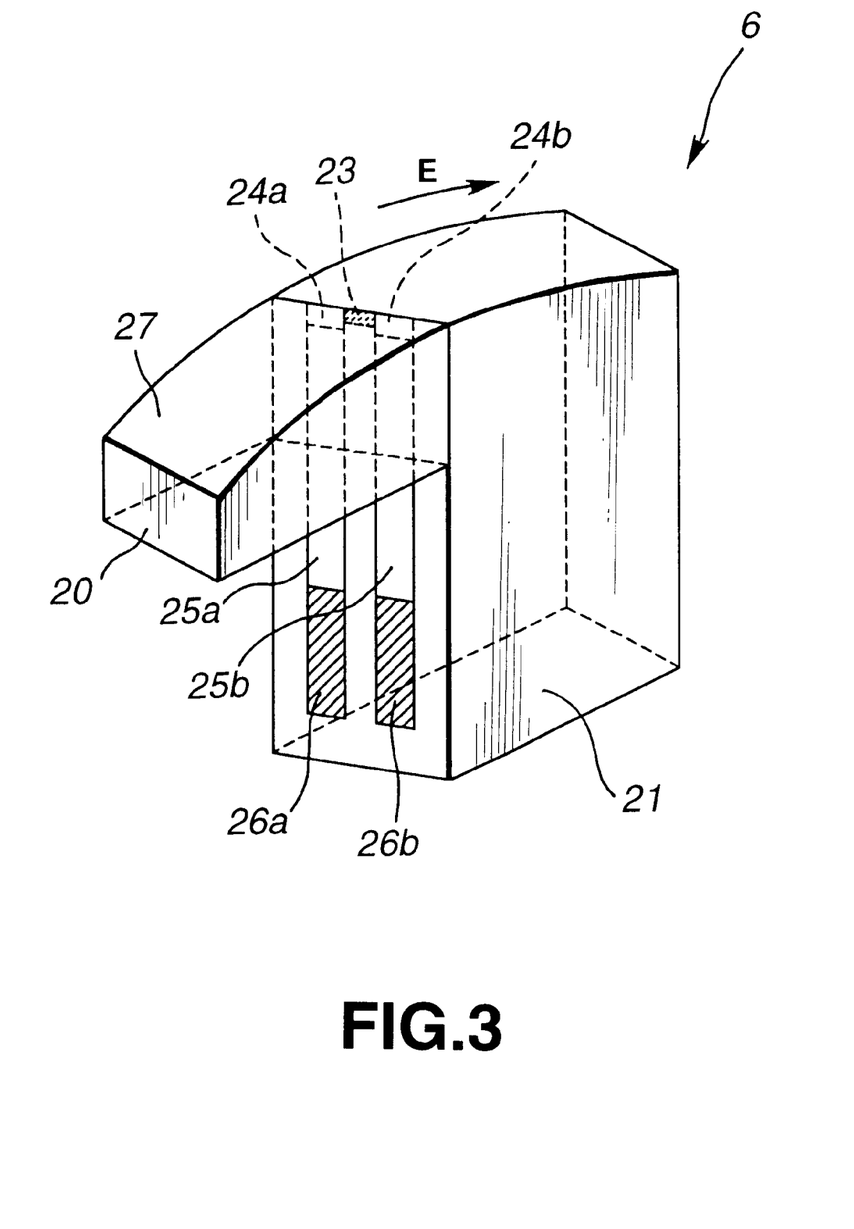
FIG. 3 is a perspective view showing a typical MR head loaded on the rotary drum.
Figure 4:
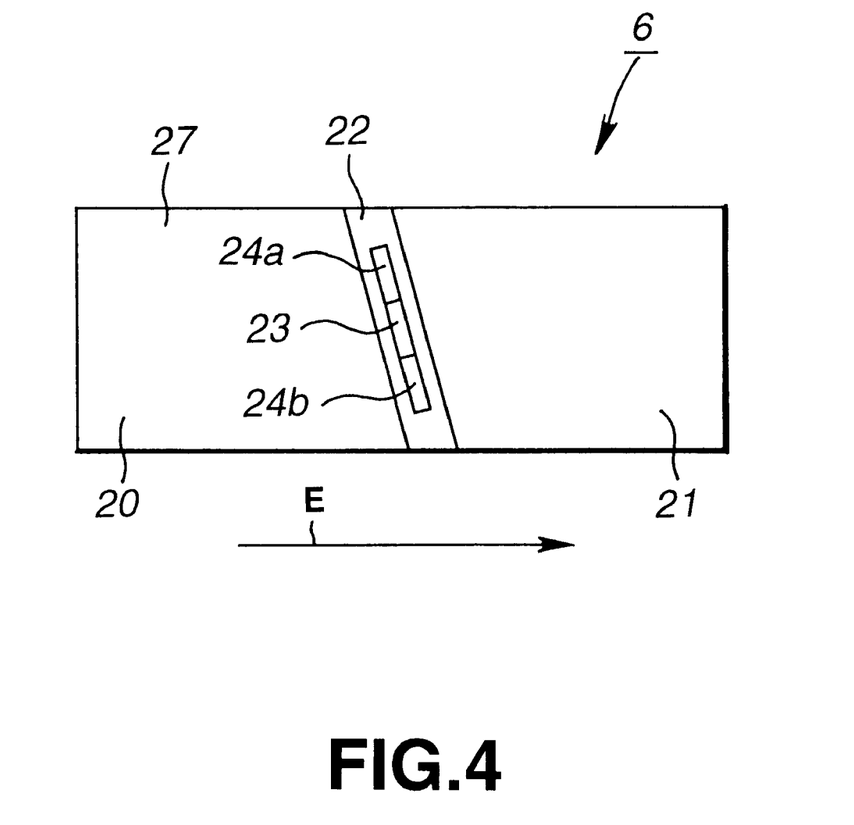
FIG. 4 is a plan view showing the MR head as viewed from the tape slide surface.

Referring to FIGS. 3 and 4, this MR head 6 includes a pair of magnetic shields 20, 21, formed of a soft magnetic material, an MR element unit 23 sandwiched via an insulator 22 by the magnetic shields 20,21, permanent magnet films 24a, 24b arranged on both ends of the MR element unit 23 and conductors 25a, 25b connected to the permanent magnet films 24a, 24b, respectively.

The MR element unit 23 is made up of an MR element exhibiting the magneto-resistive effect, a soft adjacent layer (SAL) film for applying a perpendicular bias magnetic field across the MR element and an insulating film arranged between the MR element and the SAL film.

The permanent magnet films 24a, 24b apply the horizontal magnetic field across the MR element. The conductors 25a, 25b send the sense current to the MR element via external terminals 26a, 26b formed at terminal ends.

In this MR head 6, the MR element unit 23 is of a substantially rectangular plan configuration, and is sandwiched via insulator 22 between the magnetic shields 20, 21 so that the short-axis direction of the MR element unit 23 is substantially perpendicular to the sliding surface 27 for the magnetic tape and a lateral side of the MR element unit 23 is exposed to the sliding surface 27 for the magnetic tape.

This MR head 6 is loaded on the rotary drum 3 so that at least a portion thereof is protruded from the outer periphery of the rotary drum 3. The MR head 6 also has the slide surface 27 for the magnetic tape ground cylindrically along the sliding direction of the MR head 6 with respect to the magnetic tape 7 and along the direction perpendicular to the sliding direction.

That is, the sliding surface 27 for the magnetic tape of the MR head 6 is substantially spherical in profile so that the MR element unit 23 and its neighboring portion are protruded most outstandingly. The MR head 6 is loaded on the rotary drum 3 so that the MR element unit 23 and its neighboring portion are protruded from the outer rim of the rotary drum 3.

However, if the magnetic tape 7 is slid at an elevated speed relative to the magnetic head, the sliding surface for the magnetic tape is worn out by sliding movement relative to the magnetic tape 7. In particular, the MR head 6 is susceptible to attrition. The magnitude of tolerance of the MR head 6 with respect to the attrition is said in general to be approximately one-fifth to one-twentieth that of the inductive magnetic head 5.

If the inductive magnetic head 5 and the MR head 6 are loaded on the same rotary drum 3, the MR head 6 is affected more significantly by attrition than the inductive magnetic head 5, and reaches its limit attrition sooner to become unusable, even although the inductive magnetic head 5 is still sufficiently usable.

Figure 6:
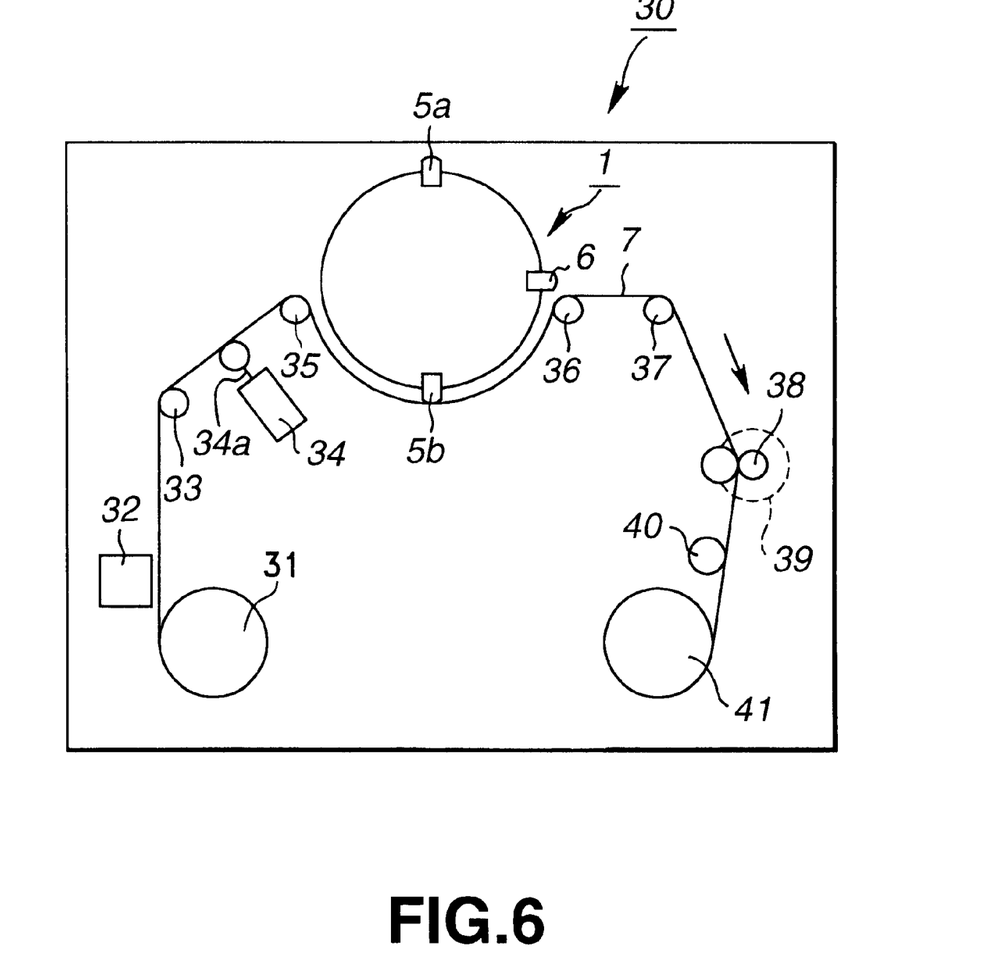
FIG. 6 is a schematic plan view showing an illustrative structure of a magnetic tape feed mechanism including the rotary drum.

Thus, in the present rotary drum device 1, the MR head 6 is protruded from the outer periphery of the rotary drum 3 by a protruding amount t1 smaller than a protruding amount t2 of the inductive magnetic head 5 from the outer periphery of the rotary drum 3, as shown in FIG. 6, which schematically shows the state in which part of the inductive magnetic head 5 and part of the MR head 6 are protruded from the outer periphery of the rotary drum 3. As for the protruding amounts of the magnetic head, the protruding amount t2 of the inductive magnetic head 5 is of the order of 25 $\mu$m, while the protruding amount t1 of the MR head 6 is of the order of 15 $\mu$m.

With the present rotary drum device 1, in which the protruding amount of the MR head 6 is selected to be smaller than the protruding amount t2 of the inductive magnetic-head 5, the contact pressure between the MR head 6 and the magnetic tape 7 becomes smaller than that between the inductive magnetic head 5 and the magnetic tape 7.

Thus, with the present rotary drum device 1, it is possible to suppress attrition of the MR head 6 when the inductive magnetic head 5 and the MR head 6 are kept in sliding contact with the magnetic tape 7 to effect recording/reproduction.

Figure 5:
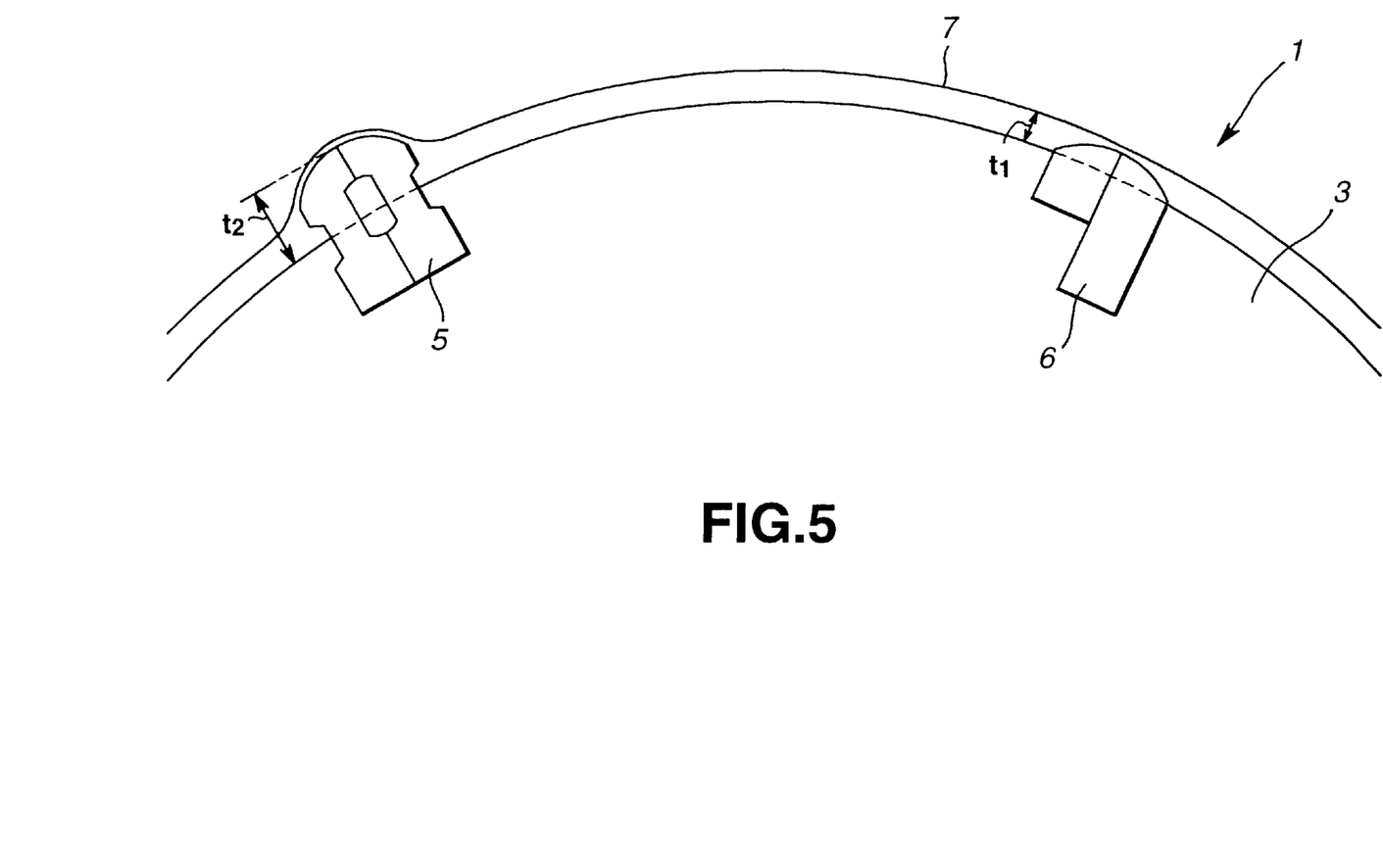
FIG. 5 shows the state in which the inductive magnetic head and the MR head loaded on the rotary drum are protruded from the outer periphery of the rotary drum.

With the magnetic recording/reproducing apparatus, the magnetic tape 7 is slid with respect to the rotary drum device 1 in order to record data on the magnetic tape 7 or reproduce data from the magnetic tape 7. FIG. 5 is schematic plan view of a magnetic tape feed mechanism 30 including the rotary drum device 1.

This magnetic tape feed mechanism 30 includes a supply reel 31, tape sort discriminating means 32, a guide roll 33, tape tension control means 34, a guide roll 35, a rotary drum device 1, guide rolls 36, 37, a capstan 38, a capstan motor 39, a guide roll 40 and a take-up roll 41.

Specifically, during recording/reproduction, the magnetic tape 7 is fed from the supply reel 31 through the guide rolls 32, 33 so as to be entwined about the rotary drum device 1, as shown in FIG. 5, in order to be recorded or reproduced by this rotary drum device 1.

For reproducing information signals from the magnetic tape 7 by the above-described magnetic tape feed mechanism 30, the magnetic tape 7 is first paid out from the supply reel 31.

The magnetic tape 7, paid out from the magnetic tape feed mechanism 30, has its sort detected by the tape sort discriminating means 32.

The magnetic tape is classed into one for use on an inductive magnetic head and one for use on an MR head. With the magnetic tape manufactured for use on an inductive magnetic head suffering from attrition to a lesser extent, measures for reducing attrition of the magnetic head are not taken sufficiently. However, the MR head is susceptible to attrition significantly such that the magnetic tape to be used on the inductive magnetic head cannot be used for the MR head. Thus, a magnetic tape in which measures have been taken to reduce the attrition of the magnetic head has been developed. The tape sort discriminating means 32 detects these tape sorts.

As a method for detecting the tape sort, an identification signal specifying the tape sort is pre-recorded on the magnetic tape. The tape sort discriminating means 32 reads out the identification signal recorded on the magnetic tape 7 to detect the sort of the magnetic tape 7.

If the sort of the magnetic tape 7 is detected by the tape sort discriminating means 32, the magnetic head used for reproducing the information signals from the magnetic tape 7 is selected from the inductive magnetic head 5 and the MR head 6.

The tape tension control means 34 controls the tape tension depending on the sort of the magnetic tape 7. The tape tension control means 34 has an extensible tape support bar 34a for supporting the magnetic tape 7. The tape tension control means 34 extends the tape support bar 34a to increase the tension of the magnetic tape 7 or contracts the tape support bar 34a to reduce the tape tension of the magnetic tape 7.

If information signals are to be reproduced from the magnetic tape 7 by the inductive magnetic head 5b, the tape sort discriminating means 32 extends or contracts the tape support bar 34a to increase or reduce the tape tension of the magnetic tape 7, respectively.

Specifically, for reproducing information signals from the magnetic tape 7 by the inductive magnetic head 5b, the tape sort discriminating means 32 sets the tape tension of the magnetic tape 7 to, for example, approximately 4 g/cm.

The magnetic tape 7 is routed via the guide roll 35 as the tape is entwined about the rotary drum device 1 so that the information signals are reproduced on this rotary drum device 1 by the inductive magnetic head 5b.

When the inductive magnetic head 5b is slid against the magnetic tape 7, the magnetic tape is mainly supported by the rotary drum 3 and an air stream produced by rotation of the rotary drum 3. At this time, the inductive magnetic head 5b, whose magnetic gap portion and its near-by portions are protruded from the outer periphery of the rotary drum 3, has a sliding contact with the magnetic tape 7 to form a tent-like portion in the magnetic tape 7.

Since the inductive magnetic head 5b has its sliding surface 16 for the magnetic tape ground cylindrically so that the magnetic gap 13 and its near-by portion are protruded most significantly from the outer periphery of the rotary drum 3 and is supported on the rotary drum 3 so that these portions are protruded from the outer periphery of the rotary drum 3, the magnetic gap 13 has optimum abutment characteristics with respect to the magnetic tape 7.

Also, since the protruding amount of the inductive magnetic head 5b from the outer periphery of the rotary drum 3 is selected to be larger than that of the MR head 6 from the outer periphery of the rotary drum 3, it is possible to maintain optimum abutment between the inductive magnetic head 5b and the magnetic tape 7.

Thus, in reproducing information signals from the inductive magnetic head 5b, the protruding amount of the MR head 6 is selected to be smaller than that of the inductive magnetic head 5b from the outer periphery of the rotary drum 3, the contact contact pressure between the MR head 6 and the magnetic tape 7 is reduced to suppress the attrition to the MR head 6.

Figure 7:
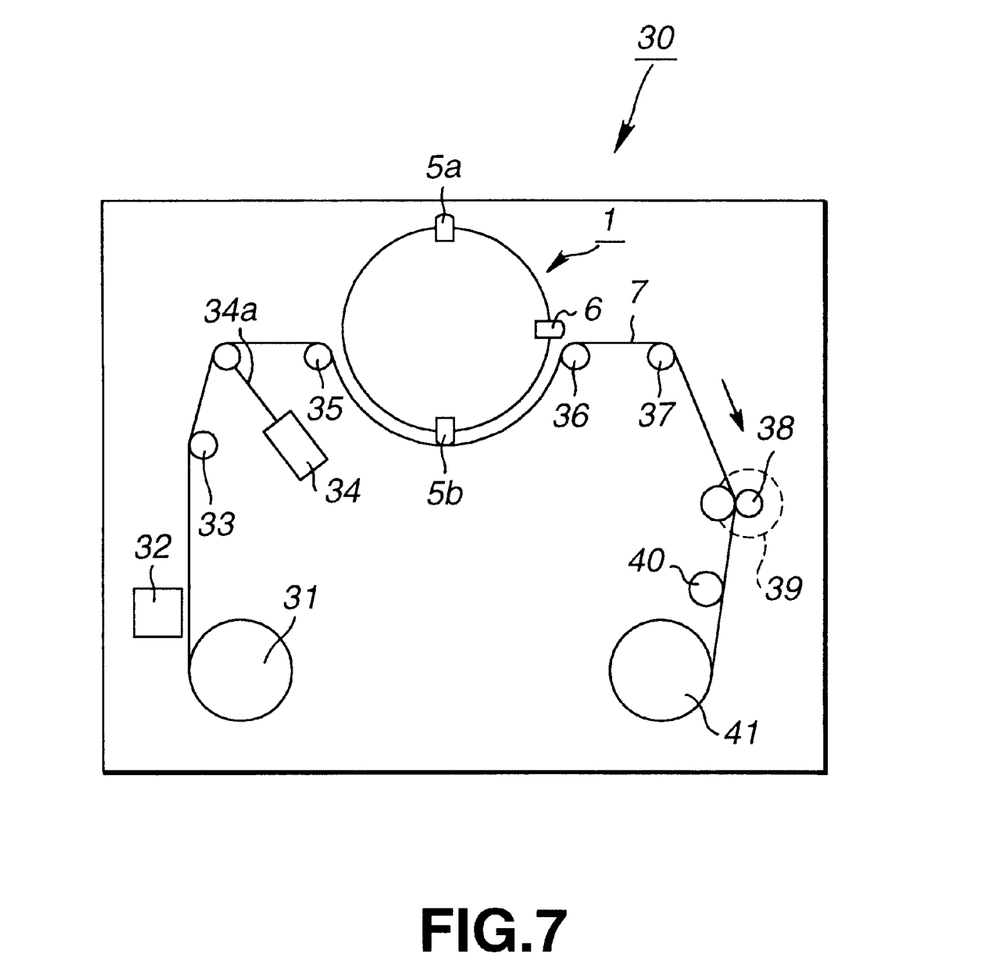
FIG. 7 is a schematic plan view showing a magnetic tape feed mechanism on the occasion of reproduction with the MR head.

In reproducing the information signals from the magnetic tape 7 by the MR head 6, the tape sort discriminating means 32 extends the tape support bar 34a to increase the tape tension of the magnetic tape 7. Specifically, for reproducing information signals from the magnetic tape by the MR head, the tape sort discriminating means 32 sets the tape tension of the magnetic tape 7 to, for example, 6 g/cm.

The magnetic tape 7 is fed via guide roll 35 so as to be entwined about the rotary drum device 1 so that the information signals are reproduced by the MR head 6 on the rotary drum device 1.

Since the protruding amount of the MR head 6 from the outer peripheral surface of the rotary drum is selected to be smaller than that of the inductive magnetic heads 5a, 5b, the contact pressure between the MR head 6 and the magnetic tape 7 is small if the tape tension of the magnetic tape 7 is small, such that optimum abutment between the MR head 6 and the magnetic tape 7 cannot be achieved.

Thus, in reproducing information signals by the MR head, abutment between the MR head 6 and the magnetic tape 7 can be optimized by increasing the tape tension of the magnetic tape 7. Also, the MR head 6 has the sliding surface 27 for the magnetic tape ground cylindrically so that the MR element unit 23 and its neighboring portion 23 are protruded most prominently, and is loaded on the rotary drum 3 so that its portion is protruded from the outer rim of the rotary drum 3, the MR element unit 23 has optimum abutment characteristics with respect to the magnetic tape.

The magnetic tape 7, recorded or reproduced by the rotary drum device 1, is routed via guide rolls 36, 37, capstan 38 and the guide roll 40 to the take-up roll 41. That is, the magnetic tape 7 is fed at a pre-set tension and velocity by the capstan 38 run in rotation by the capstan motor 39 and brought into sliding contact at a pre-set contact pressure with the inductive magnetic heads 5a, 5b and with the MR head 6 loaded on the rotating rotary drum 3 so as to be taken up on the take-up roll 41.

When the magnetic tape 7 is fed in this manner, the rotary drum 3 is run in rotation by the motor 4 as indicated by arrow A in FIG. 1. On the other hand, the magnetic tape 7 is fed so as to slide obliquely relative to the fixed drum 2 and the rotary drum 3 along the reel guide portion 8 of the fixed drum 2. That is, the magnetic tape 7 is sent along the reel guide portion 8 in the tape running direction from the tape inlet side in sliding contact with the fixed drum 2 and the rotary drum 3 as indicated by an arrow B in FIG. 1, so as to be then routed to the tape outlet side, as indicated by arrow C in FIG. 1.

Meanwhile, the identification signal specifying the sort of the magnetic tape 7 may be recorded on a tape cartridge housing the magnetic tape 7. In such case, the tape sort discriminating means 32 reads out the identification signal recorded on the tape cartridge to detect the sort of the magnetic tape 7.

Although the rotary drum device having a sole inductive magnetic head for recording, a sole inductive magnetic head for reproduction and a sole MR head on a rotary drum has been described in the foregoing, the present invention may also be applied to a magnetic reproducing method and apparatus having a rotary drum device on the rotary drum of which are mounted plural inductive magnetic heads for recording, plural inductive magnetic heads for reproduction and plural MR heads.

According to the present invention, the contact pressure between the MR head and the magnetic tape can be reduced to suppress attrition to the MR head. In addition, according to the present invention, it is possible to realize abutment between the MR head and the magnetic tape by increasing the tape tension of the magnetic tape when using the MR head, thus realizing an optimum reproducing state.

Thus, the present invention realizes a magnetic reproducing method and apparatus of the helical scan system employing an MR head as a playback magnetic head.

What is claimed is:

1. A magnetic signal reproducing apparatus, comprising:
    a substantially cylindrically-shaped rotary drum;
    an inductive magnetic head loaded on the rotary drum so that at least a portion thereof is protruded from the outer periphery of the rotary drum; and
    a magneto-resistive effect magnetic head loaded on the rotary drum so that at least a portion thereof is protruded from the outer periphery of the rotary drum,
    wherein the amount of protrusion of the magneto-resistive effect magnetic head from the outer periphery of the rotary drum is smaller than the amount of protrusion of the inductive magnetic head from the outer periphery of the rotary drum.

2. The magnetic signal reproducing apparatus according to claim 1, further comprising:
    tape sort discriminating means for detecting the sort of the magnetic tape; and
    tape tension control means for controlling the tape tension of the magnetic tape,
    wherein in reproducing information signals from the magnetic tape, the sort of the magnetic tape is detected by the tape sort discriminating means, the magnetic head used for reproducing the information signals is selected from the group of the inductive magnetic head and the magneto-resistive effect magnetic head depending on the results of detection,
    wherein the tape tension in case of reproducing the information signals by the inductive magnetic head is controlled by the tape tension control means so as to be smaller than the tape tension when the information signals are reproduced by the magneto-resistive effect magnetic head, and
    wherein the tape sort discriminating means detects the sort of the magnetic tape by detecting a signal indicating the sort of the tape recorded on the magnetic tape.

3. The magnetic signal reproducing apparatus according to claim 1 further comprising:
    tape sort discriminating means for detecting the sort of the magnetic tape; and
    tape tension control means for controlling the tape tension of the magnetic tape,
    wherein in reproducing information signals from the magnetic tape, the sort of the magnetic tape is detected by the tape sort discriminating means, the magnetic head used for reproducing the information signals is selected from the group of the inductive magnetic head and the magneto-resistive effect magnetic head depending on the results of detection, wherein the tape tension in case of reproducing the information signals by the inductive magnetic head is controlled by the tape tension control means so as to be smaller than the tape tension when the information signals are reproduced by the magneto-resistive effect magnetic head, and wherein the tape sort discriminating means detects the sort of the magnetic tape by detecting a signal indicating the sort of the tape recorded on the tape cartridge accommodating a magnetic tape.

4. A magnetic signal reproducing method for reproducing magnetic signals using a magnetic signal reproducing apparatus comprising:

a substantially cylindrically-shaped rotary drum;

an inductive magnetic head loaded on the rotary drum so that at least a portion thereof is protruded from the outer periphery of the rotary drum;

a magneto-resistive effect magnetic head loaded on the rotary drum so that at least a portion thereof is protruded from the outer periphery of the rotary drum;

tape sort discriminating means for detecting the sort of the magnetic tape; and tape tension control means for controlling the tape tension of the magnetic tape; tape tension control means for controlling the tape tension of the magnetic tape, wherein the amount of protrusion of the magneto-resistive effect magnetic head from the outer periphery of the rotary drum is smaller than the amount of protrusion of the inductive magnetic head from the outer periphery of the rotary drum, wherein in reproducing information signals from the magnetic tape, the sort of the magnetic tape is detected by the tape sort discriminating means, the magnetic head used for reproducing the information signals is selected from the group of the inductive magnetic head and the magneto-resistive effect magnetic head depending on the results of detection, and wherein the tape tension in case of reproducing the information signals by the inductive magnetic head is controlled by the tape tension control means so as to be smaller than the tape tension when the information signals are reproduced by the magneto-resistive effect magnetic head.

* * * * *